(No Model.)

W. E. WARD.
MACHINE FOR FORMING NUT BLANKS.

No. 353,901. Patented Dec. 7, 1886.

WITNESSES.
Joseph H. Marshall
Joseph Haight

INVENTOR,
W. E. Ward (No Model.) 3 Sheets—Sheet 2.

W. E. WARD.
MACHINE FOR FORMING NUT BLANKS.

No. 353,901. Patented Dec. 7, 1886.

WITNESSES.
Joseph M. Marshall
Joseph Haight

INVENTOR.
W. E. Ward (No Model.) 3 Sheets—Sheet 3.

W. E. WARD.
MACHINE FOR FORMING NUT BLANKS.

No. 353,901. Patented Dec. 7, 1886.

WITNESSES,
Joseph H. Marshall
Joseph Haight

INVENTOR.
W. E. Ward

UNITED STATES PATENT OFFICE.

WILLIAM E. WARD, OF PORT CHESTER, NEW YORK.

MACHINE FOR FORMING NUT-BLANKS.

SPECIFICATION forming part of Letters Patent No. 353,901, dated December 7, 1886.

Application filed May 29, 1886. Serial No. 203,585. (No model.)

*To all whom it may concern:*

Be it known that I, WILLIAM E. WARD, a citizen of the United States, residing at Port Chester, in the county of Westchester and State of New York, have invented a new and useful Improvement in Machines for Forming Nut-Blanks; and I do hereby declare the following specification, taken in connection with the accompanying drawings, forming a part of the same, to be a full, clear, and exact description thereof.

In my invention three punches are employed, all of which are preferably attached to the same reciprocating plunger. The first punch in the series produces in the bar of stock the holes which are finally to receive the threads of the nuts. The second punch in the series punches the nut-blanks from the bar of stock, while the last punch of the series forces the blanks through a shearing-die for trimming their edges.

The prominent characteristic feature of the invention embodied in the machine hereinafter to be described is in the employment, with a punch and die for cutting out nut-blanks from a bar of stock and a punch and die for trimming or shearing the nut-blanks previously cut out, of a nut-blank receiver and transferrer under such an arrangement that the nut-blank receiving and transferring device will be able to change place from a position in front of the trimming-die to a position in the rear of the cutting-out die during the same advancing movements of the said punches. The combination of devices employed and their arrangement enable a machine of this class to be much simplified in construction and to be attended with greatly-increased economy in operation.

Figure 1:
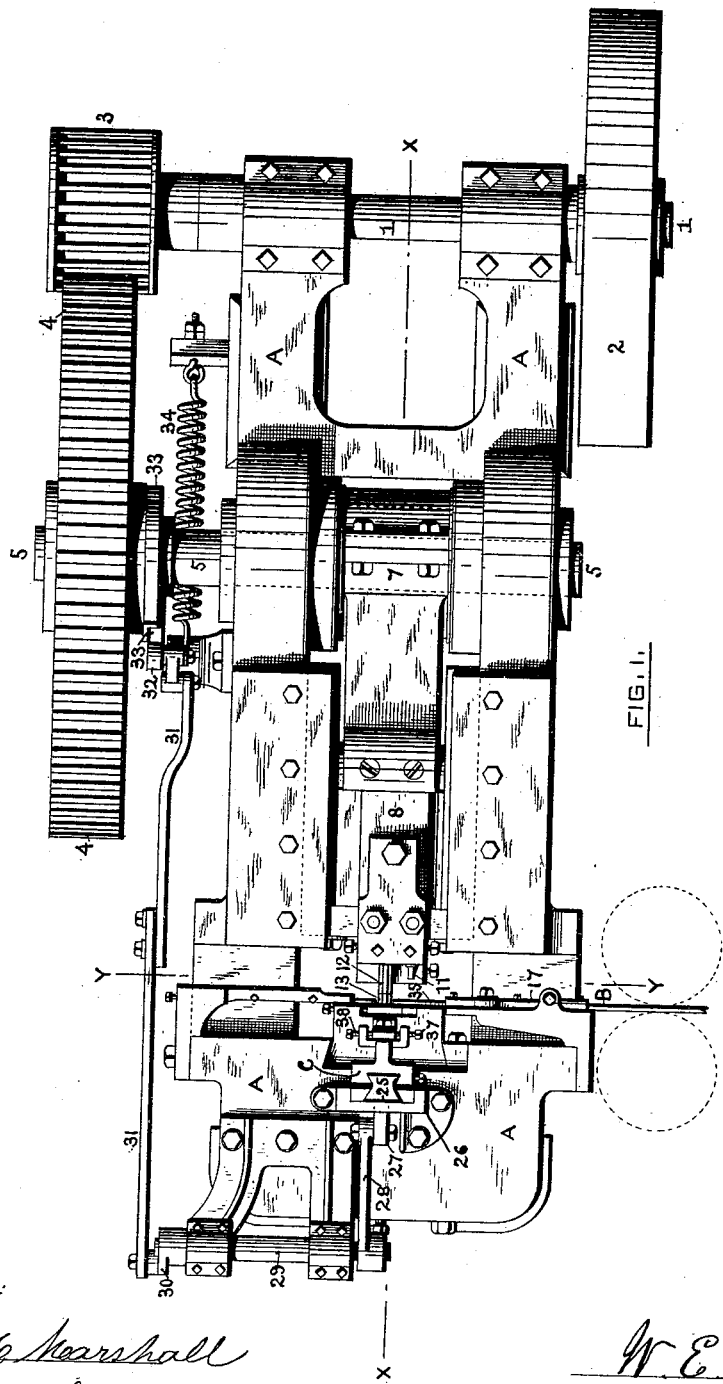
Figure 2:
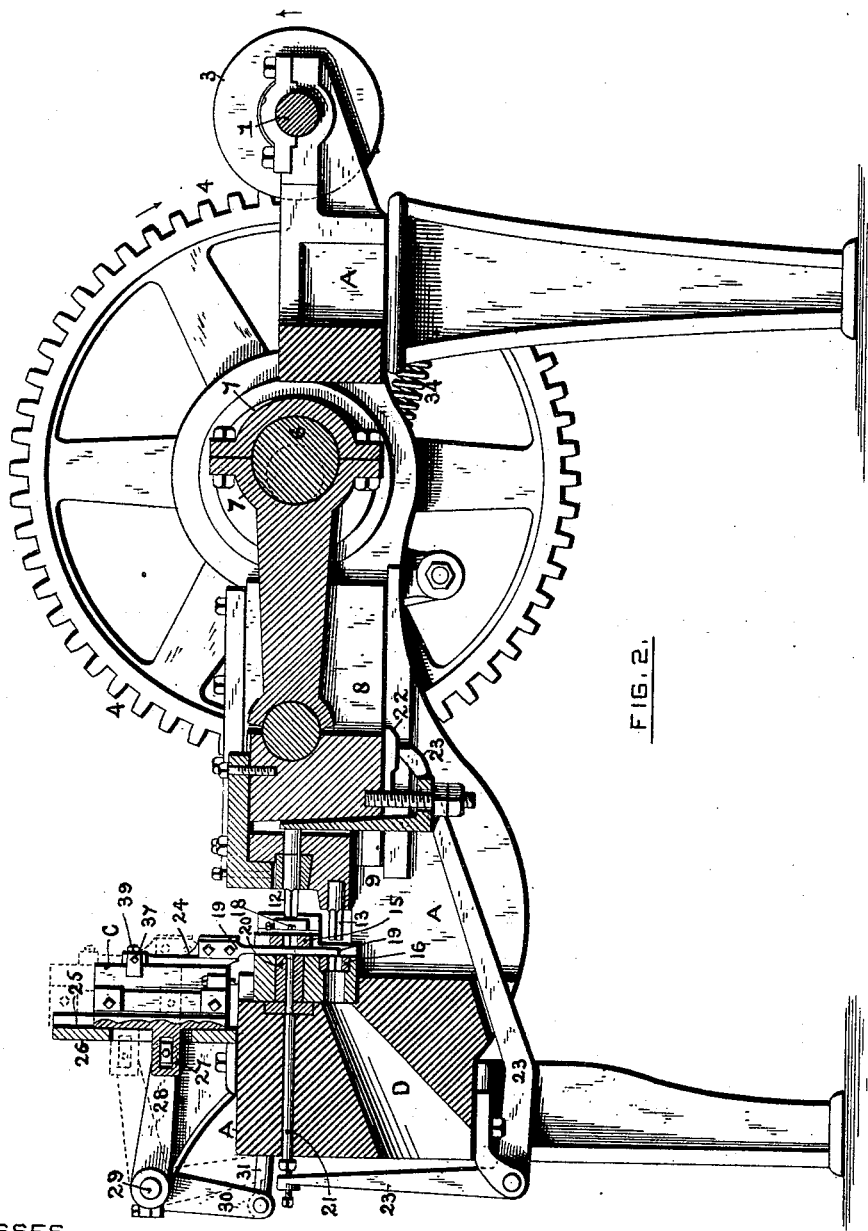
Figure 3:
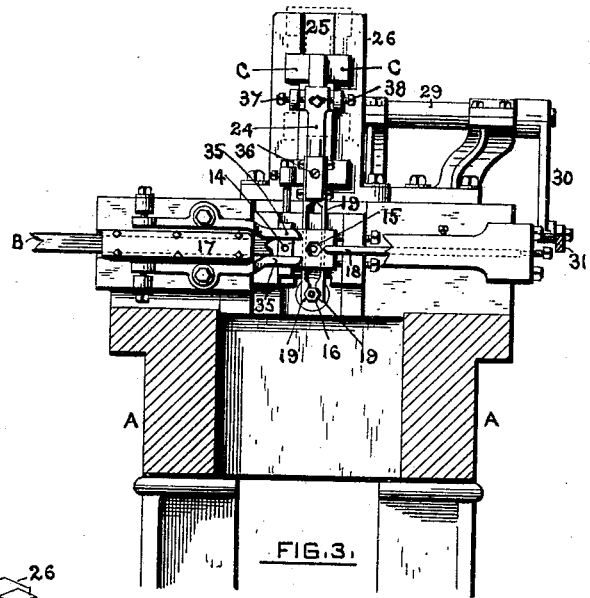
Figure 4:
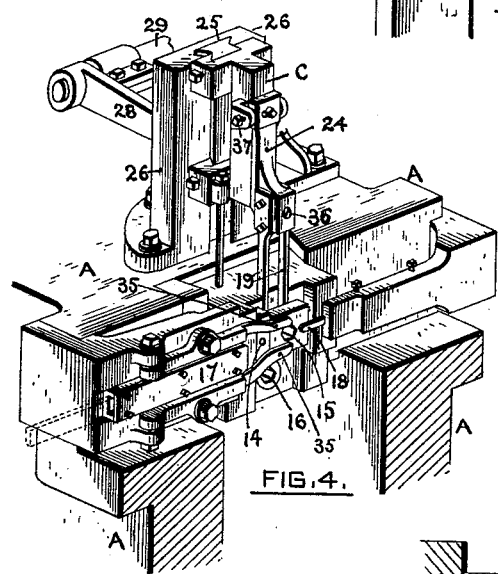
Figure 5:
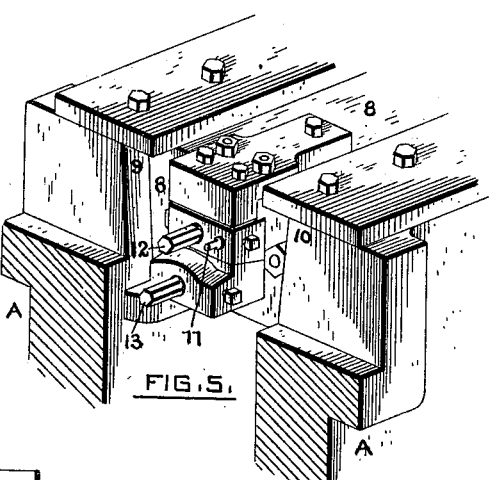
Figure 6:
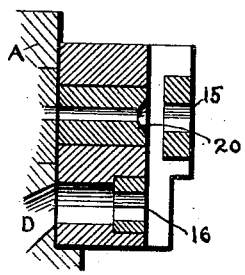

In the accompanying drawings, Figure 1 shows a top view of a machine embodying the invention. Fig. 2 represents a vertical longitudinal section of the same on line X X. Fig. 3 shows a vertical transverse section of the machine on line Y Y. Fig. 4 represents in perspective the dies and transferring-tongs mounted in the machine. Fig. 5 shows in perspective the reciprocating plunger and the punches mounted thereon. Fig. 6 represents, on an enlarged scale, a vertical section through the cutting-out, crowning, and shearing dies and that part of the machine in which they are mounted.

A is the frame of the machine, upon which the various parts are mounted. The driving-shaft is shown at 1, Figs. 1 and 2, to which motion is communicated by means of a belt driving a pulley, 2, on said shaft. A toothed pinion, 3, on the shaft 1 engages with the gear-wheel 4 on the shaft 5. This shaft is provided with an eccentric wheel, 6, Fig. 2, and strap 7, for communicating a reciprocating movement to the plunger 8 in the ordinary and well-understood way. The plunger 8 works in guides 9 and 10, Fig. 5, and its front face is provided with three punches, 11 12 13, which are respectively for punching in the bars of stock holes to be threaded, for punching out the blanks from such bars, and for forcing the nut-blanks through a shearing-die.

The dies which are used in combination with the three punches above mentioned are shown at 14, 15, and 16, Figs. 3 and 4, and two of them in vertical section at Figs. 2 and 6.

The bar of stock B is fed to the machine through a box-guide, 17, and a stop, 18, is employed to gage the longitudinal position of the bar. For receiving the nut-blanks after they are punched from the bar, and transferring such blanks to a position to be trimmed or sheared, a receiving and transferring device is employed, which, as shown in the drawings, is in the form of a pair of tongs, 19, Figs. 2, 3, and 4. These tongs have their legs attached to a block, 24, Figs. 2, 3, and 4, which block is attached to a head-block, C, arranged to slide vertically in a groove, 25, in a standard, 26, upon the frame of the machine. The head-block C has a rearward projection, 27, as seen at Figs. 1 and 2. This projection is slotted for receiving a pin upon an arm, 28, secured to a rock-shaft, 29. This rock-shaft is worked in one direction through a vertical arm, 30, attached to the same, and a rod, 31, linked to a vertical arm, 32, Fig. 1, (pivoted to the frame of the machine,) by a cam, 33, and in the opposite direction by a spring, 34, or by a suitable conformation of said cam. The said cam and spring operate to reciprocate the tongs 19 in a vertical plane, so as to bring the same alternately into alignment with the cutting-out punch and die and the trimming punch and die; or, as above indicated, the cam alone may reciprocate the tongs.

Suppose, now, the machine to be in full operation turning out finished nut-blanks, and the plunger 8, carrying the several punches 11, 12, and 13, to be advancing. The punch 11, in combination with its die 14, causes a hole to be made through the bar of stock, which hole will become the central hole of the nut-blank after the bar has been, in the continued operation of the machine, fed far enough to have the axis of the hole coincide with the axis of the punch 12, and such punch and its co-operating die 15 have done their work of cutting out a blank from the bar. The same advancing movement of the plunger 8 which effects the foregoing operation will also cause the punch 13 to force the nut-blank, which was cut out from the bar of stock by the effect of the next preceding advancing movement of the plunger, from the possession of the holding and transferring tongs 19 into the shearing or trimming die 16, from whence the blank will be discharged through the duct D as a finished article. The said tongs at the moment of the advance of the punch 13 stand with a nut-blank in their grasp, as shown in Fig. 3, the axis of the blank and the axes of the punch 13 and its fellow trimming-die 16 being in alignment. So soon as the punch 13 and its die 16 have obtained possession of the said nut-blank the tongs 19 are pulled away from the blank by the action of the spring 34, or by a suitable conformation of the cam 33, working through the connections already explained, and are instantly elevated to a plane which brings the opening between their jaws directly in rear of and in alignment with the opening in the die 15 in time to receive and take within its grasp the nut-blank, which at the same advancing movement of the plunger 8 which has effected the two operations above described will be by the punch 12 and its fellow die 15 cut out from the bar of stock.

Usually, it is preferred to make a portion of the top surface of the nut-blank crowning or dome shaped. This is accomplished, as is well understood, by making a depression of corresponding form in a die commonly called the "crowning-die," as seen at 20, Fig. 6. The advancing movement of the punch 12 in this machine will, after it has cut out, by the aid of the die 15, the nut-blank from the bar and forced the blank into the grasp of the tongs, also, by the aid of the crowning-die 20, dome the upper surface of the blank, and in doing this the blank will be partly in the possession of the tongs and partly in the possession of the crowning-die. To restore the blank to the sole possession of the tongs and prevent the possibility of its becoming displaced in them when they are required to carry the blank into alignment with the punch 13 and trimming-die 16 in season for the next following advancing movement of the plunger 8 and its punch 13, a clearer-rod, 21, is employed, which rod is operated during the retreat of the plunger 8 by the action of an inclined plane, 22, (located on the under side of said plunger, as shown in Fig. 2,) upon a bell-crank lever, 23, the upper end of which engages the rear end of the rod 21.

It will thus be understood from the foregoing description that for every advancing movement of the plunger 8 a hole is punched in the bar of stock, a nut-blank is cut from the bar of proper polygonal form and crowned, and a nut-blank is trimmed and discharged.

So far as I am aware, no previous nut-making machine has accomplished the same series of operations within the small compass of time required for a single thrust of the punches to be made. The result is due, essentially, to the employment in the combination of nut-holding and transferring tongs which are capable of giving up the nut-blank which they carry to the trimming die and punch so soon as these latter commence to operate upon it, and which are made to execute a return movement to position for receiving another nut-blank then being cut out from the bar of stock in advance of the rate of movement of the punch-carrying plunger. Any combination of a cutting-out punch and die, a trimming punch and die, and a nut-blank receiver and transferrer which possesses the characteristics and is arranged to perform the functions above mentioned I consider will be an employment of my invention.

It is not indispensably necessary that the series of punches 11, 12, and 13 should be attached to one common plunger, but each may be attached to a plunger appropriate to itself and operated by its own eccentric or equivalent device; but no advantage would result from this formal modification, neither would such change involve any departure from the principle of the machine as hereinbefore described.

For the purpose of practically adapting the machine to work upon stock of varying widths, certain adjustments are introduced. For example, in front of the box-guide 17 a pair of parallel guides, 35, are placed, which can be adjusted relatively to each other and to the said guide and the dies 14 and 15, as clearly shown at Fig. 4 of the drawings; also, an adjusting means for bringing the tongs 19 into proper alignment with the dies 15 and 16 is shown at Figs. 3 and 4 of the drawings, wherein the block 24 is represented as secured by a fulcrum-pin, 36, to the head-block C, so that it can be swung thereon between two adjusting-screws, 37 and 38, passing through ears on the head-block, a clamp-screw, 39, being preferably employed to hold it in place when adjusted.

What I claim as my invention, and desire to secure by Letters Patent, is—

1. The combination, substantially as hereinbefore set forth, of a punch and die for cutting out nut-blanks from a bar of stock, a punch and die for trimming or shearing the blanks so cut out, and a nut-blank receiver and transferrer, arranged substantially as described, to change place from in front of the trimming or shearing die to in rear of the cutting-out die during the same advancing movements of the said punches.

2. The combination, substantially as hereinbefore set forth, of a punch and die for cutting out a nut-blank from a bar of stock, a nut-blank receiving and transferring device, substantially as described, a punch and shearing-die for trimming the outside of the nut-blank, and mechanism, substantially as described, for causing the nut-blank receiver to transfer the blank to a position where it can be acted upon by the shearing die and its punch and be returned to position in alignment with the cutting-out die in time to receive the next blank while the punch and shearing-die are operating upon the previous blank.

3. The combination and arrangement of a punch and die for cutting out a nut-blank from a bar of stock, a punch and die for shearing the outside of the blank, and a receiving and transferring device, substantially as described, arranged to vibrate in a path which is in the rear of the cutting-out die and in front of the shearing-die and be alternately in alignment with said dies, respectively, substantially as set forth.

4. The combination, substantially as hereinbefore set forth, of a punch and die for punching holes in a bar of stock, a punch and die for cutting out nut-blanks from said bar, said punch also delivering the blanks to receiving tongs or holders and forcing them partially out of the holder and into a crowning-die, a clearer, substantially as described, for restoring the blanks to the sole possession of the holder, a holding and transferring device for the nut-blanks arranged to move relatively to the cutting-out die and to the shearing-die, as described, and a punch and shearing-die for trimming the outside of the blanks.

W. E. WARD.

Witnesses:
JOSEPH H. MARSHALL,
JOSEPH HAIGHT.